United States Patent
Taboriskiy (10) Patent No.: US 10,621,250 B2
(45) Date of Patent: Apr. 14, 2020

(54) NOTIFYING USERS OF RELEVANT CONTENT

(71) Applicant: Google LLC, Mountain View, CA (US)

(72) Inventor: Alexander Taboriskiy, Zurich (CH)

(73) Assignee: Google LLC, Mountain View, CA (US)

(*) Notice: Subject to any disclaimer, the term of this patent is extended or adjusted under 35 U.S.C. 154(b) by 430 days.

(21) Appl. No.: 15/322,970

(22) PCT Filed: Sep. 15, 2015

(86) PCT No.: PCT/US2015/050211
§ 371 (c)(1),
(2) Date: Dec. 29, 2016

(87) PCT Pub. No.: WO2016/048719
PCT Pub. Date: Mar. 31, 2016

(65) Prior Publication Data
US 2018/0107743 A1    Apr. 19, 2018

Related U.S. Application Data

(60) Provisional application No. 62/054,202, filed on Sep. 23, 2014.

(51) Int. Cl.
*H04L 29/08* (2006.01)
*G06F 16/9535* (2019.01)
(Continued)

(52) U.S. Cl.
CPC .... *G06F 16/9535* (2019.01); *G06F 16/24578* (2019.01); *G06Q 30/02* (2013.01);
(Continued)

(58) Field of Classification Search
CPC ....... H04L 67/22; H04L 67/24; G06F 16/337; G06F 16/2465; G06F 16/334; G06F 16/335; H04N 21/472; H04N 21/47214
See application file for complete search history.

(56) References Cited

U.S. PATENT DOCUMENTS 9,531,651 B1 * 12/2016 Cherubini ............... H04L 51/00
9,628,576 B1 *  4/2017 Agarwal ................. H04L 67/22
(Continued)

FOREIGN PATENT DOCUMENTS

| CN | 101694652 | 4/2010 |
| CN | 102882936 | 1/2013 |
| CN | 104036038 | 9/2014 |

OTHER PUBLICATIONS

PCT International Search Report and Written Opinion, PCT/US2015/050211, dated Dec. 14, 2015, 9 Pages.
(Continued)

*Primary Examiner* — Chris Parry
*Assistant Examiner* — Stephen J Houlihan
(74) *Attorney, Agent, or Firm* — Byrne Poh LLP (57) ABSTRACT

Relevancy information describing a relevance of a digital content item to a user is received. The relevancy information is used to determine whether to notify the user of the digital content item. If it is determined to notify the user, it is inferred from activities of the user a time when the user is favorably disposed to consume the digital content item. A message is sent to a client device used by the user at the time when the user is favorable disposed to consume the digital content item.

18 Claims, 4 Drawing Sheets

(51) Int. Cl.
*G06F 16/2457* (2019.01)
*G06Q 30/02* (2012.01)
*G06Q 50/00* (2012.01)
*H04L 29/06* (2006.01)

(52) U.S. Cl.
CPC ......... *G06Q 50/01* (2013.01); *H04L 65/4084* (2013.01); *H04L 67/02* (2013.01); *H04L 67/26* (2013.01)

(56) References Cited

U.S. PATENT DOCUMENTS

| | | | | |
|---|---|---|---|---|
| 2008/0294772 | A1* | 11/2008 | Hagale | H04L 67/24 709/224 |
| 2009/0075691 | A1* | 3/2009 | Yang | F23Q 2/32 455/556.1 |
| 2010/0015968 | A1* | 1/2010 | Moriwaki | H04M 3/42263 455/422.1 |
| 2010/0153448 | A1 | 6/2010 | Harpur et al. | |
| 2010/0169153 | A1 | 7/2010 | Hwacinski et al. | |
| 2011/0252027 | A1* | 10/2011 | Chen | G06F 16/335 707/728 |
| 2012/0278824 | A1* | 11/2012 | Patil | H04N 21/23433 725/13 |
| 2014/0058780 | A1 | 2/2014 | Gilzean et al. | |
| 2015/0058873 | A1* | 2/2015 | Newell | H04N 21/47214 725/14 |

OTHER PUBLICATIONS

Office Action dated May 13, 2019 in CN Patent Application No. 201580034942.4.
Office Action dated Jan. 28, 2019 in CN Patent Application No. 201580034942.4.

* cited by examiner

NOTIFYING USERS OF RELEVANT CONTENT

TECHNICAL FIELD

The disclosure relates generally to the field of digital media, and specifically to notifying users of selected relevant content to review at appropriate times.

BACKGROUND

The Internet provides users with a wide variety of ways to discover relevant videos and other digital content. For example, users may search for the content directly or see content identified by other users. Oftentimes, user discover digital content at times when it is not convenient for them to consume the content. For example, a user may see a reference to a video that is interesting or otherwise relevant to the user while browsing the Internet at work. The user may not be able to watch the video until after work, or the user may prefer to watch the video at a different location.

However, for a variety of reasons users often do not consume relevant content they identified earlier. Users may simply forget about the content. Likewise, users may become distracted by new content, or by other activities. As a result, users often miss opportunities to consume content that is relevant to their interests.

SUMMARY

The above and other needs are addressed by a computer-implemented method, computer system, and non-transitory computer-readable medium storing executable computer program instructions for notifying a user of relevant content. An embodiment of the method comprises receiving relevancy information describing a relevance of a digital content item to the user and determining, responsive to the relevancy information, to notify the user of the digital content item. The method further comprises, responsive to determining to notify the user, inferring from activities of the user a time when the user is favorably disposed to consume the digital content item and sending a message to a client device used by the user at the time when the user is favorable disposed to consume the digital content item to notify the user of the digital content item.

An embodiment of the computer system comprises a computer processor for executing computer program instructions and a non-transitory computer-readable storage medium storing computer program instructions executable by a processor to perform steps. The steps comprise receiving relevancy information describing a relevance of a digital content item to the user and determining, responsive to the relevancy information, to notify the user of the digital content item. The steps further comprise, responsive to determining to notify the user, inferring from activities of the user a time when the user is favorably disposed to consume the digital content item and sending a message to a client device used by the user at the time when the user is favorable disposed to consume the digital content item to notify the user of the digital content item.

An embodiment of the non-transitory computer-readable medium stores computer program instructions executable to perform steps comprising receiving relevancy information describing a relevance of a digital content item to the user and determining, responsive to the relevancy information, to notify the user of the digital content item. The steps further comprise, responsive to determining to notify the user, inferring from activities of the user a time when the user is favorably disposed to consume the digital content item and sending a message to a client device used by the user at the time when the user is favorable disposed to consume the digital content item to notify the user of the digital content item.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

In this disclosure, the terms "digital content," "digital media content," or simply "content" generally refers to any machine-readable and machine-storable content, such as videos, e-books and music files. The following discussion focuses on videos. However, the techniques described below can also be used with other types of digital content.

Figure 1:
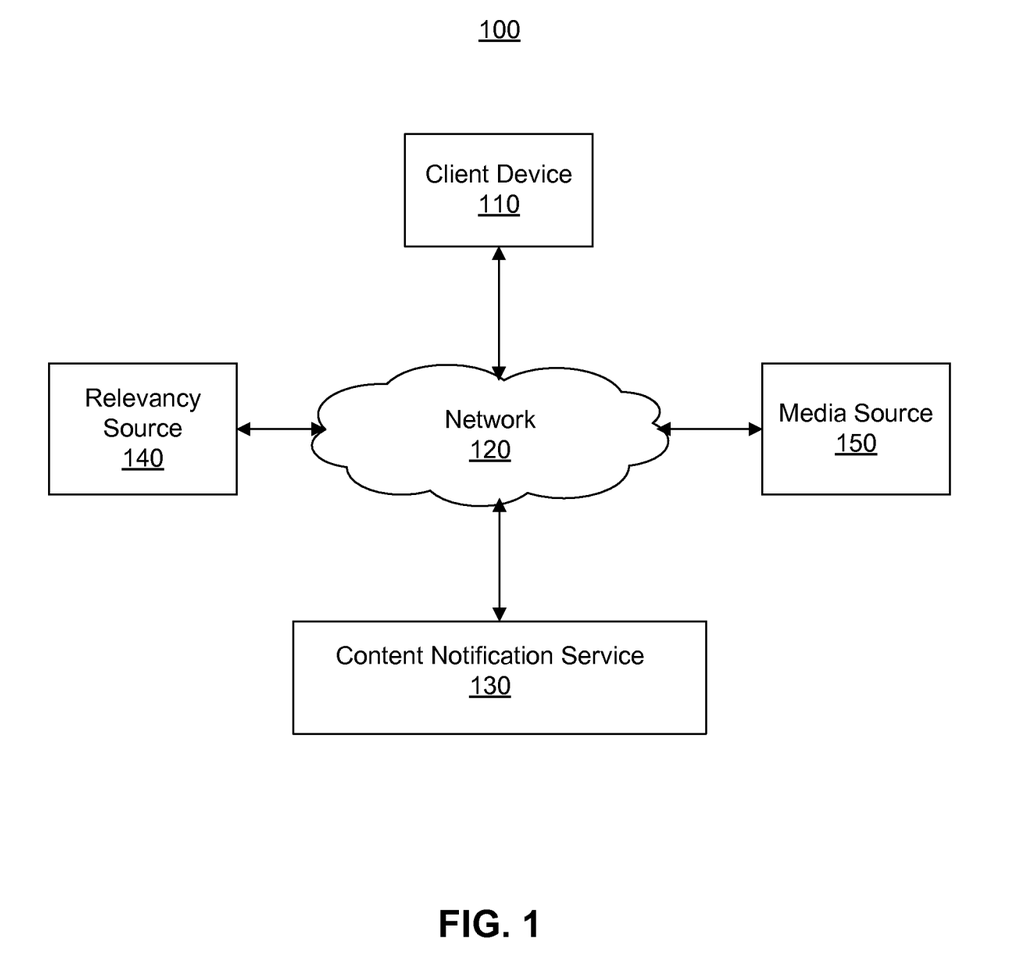
FIG. 1 shows a computing environment for notifying users of relevant media content according to one embodiment.

FIG. 1 shows a computing environment 100 for notifying users of relevant media content according to one embodiment. The computing environment 100 includes a client device 110, a content notification service 130, a relevancy source 140 and a media source 150 connected by a network 120. Only one of each entity are shown in FIG. 1 in order to simplify and clarify the description. Embodiments of the computing environment 100 can have many client devices 110, content notification services 130, relevancy sources 140 and media sources 150 connected to the network 120. Likewise, the functions performed by the various entities of FIG. 1 may differ in different embodiments.

A client device 110 is an electronic device used by a user to perform functions such as consuming digital content, executing software applications, browsing websites hosted by web servers on the network 120, downloading files and the like. For example, the client device 110 may be a media streaming device, a smart phone, or a tablet, notebook, or desktop computer. The client device 110 includes and/or interfaces with a display device on which the user may view videos and other content. In addition, the client device 110 provides a user interface (UI), such as physical and/or on-screen buttons, with which the user may interact with the client device 110 to perform functions such as selecting, purchasing, and consuming content.

The network 120 enables communications among the client device 110, the content notification service 130, the relevancy source 140 and the media source 150. In one embodiment, the network 120 comprises the Internet and uses standard communications technologies and/or protocols. In another embodiment, the entities can use custom and/or dedicated data communications technologies.

The media source 150 stores and/or otherwise provides access to digital content. In one embodiment, the media source 150 provides a web site on the network 120 having an interface allowing users of client devices 110 to access and consume content. For example, the media source may be the YOUTUBE service provided by GOOGLE INC. of Mountain View, Calif.

The relevancy source 140 provides information describing the relevancy of digital content to the users of the client devices 110. Generally, the relevancy source 140 identifies specific content items (e.g., specific videos) that are relevant to a user. In addition, the relevancy source 140 may indicate the degree of relevance of the content to the user. Depending upon the embodiment, the relevancy source 140 may be incorporated into the media source 150, associated with the media source, or independent of the media source.

In one embodiment, the relevancy source 140 describes the relevancy of content based on a user's own actions. The relevancy source 140 may provide information describing the user's interactions with the media source 150. For example, the relevancy source 140 may provide information describing the user's activities on the media source 150, such as content consumed by the user, content flagged for later review by the user (e.g., via a "save for later" feature), content channels subscribed to by the user, and searches for content conducted by the user. Likewise, the relevancy source 140 may describe the user's interactions with other entities connected to the network 120. For example, the relevancy source 140 may provide information about searches conducted by the user using general-purpose search engines, activities by the user on a social network, and the like.

An embodiment of the relevancy source 140 may also describe the relevance of content to a user based on other users' actions. The relevancy source 140 may describe content that is relevant to a user because other users similar to the user find the content to be relevant. For example, if other users who are similar to the user watch a particular video, the relevancy source 140 may describe the video as relevant to the user. Similarly, if other users connected to the user via a social network watch and/or share a particular video, then the relevancy source 140 may describe the video as relevant to the user.

The content notification service 130 receives the information describing the relevancy of content from the relevancy source 140 and notifies the users of the client devices 110 of relevant content. In one embodiment, the content notification service 130 uses the relevancy information to assess the relevancy of particular content items to a user. If the content has at least threshold amount of relevance, the content notification service 130 adds the content to a notification list of content about which to notify the user.

In addition, the content notification server 130 observes the users' activities to determine when to notify users about the content in the users' notification lists. In one embodiment, the content notification server 130 observes how a user uses one or more client devices 110 and from these observations infers when it is an appropriate time to notify the user of the relevant content in the user's notification list. In general, an appropriate time occurs when the user has free time available to consume the content, such as when the user is at home and watching television. The content notification server 130 may also determine the appropriate type of notification (e.g., how to send the notification to the user). The content notification service 130 sends the appropriate type of notification to the user at the appropriate time, thereby reminding the user about relevant content at a time when the user may consume the content.

In situations in which the systems discussed here collect personal information about users, or may make use of personal information, the users may be provided with an opportunity to control whether programs or features collect user information (e.g., information about videos a user has watched, a user's social network, social actions or activities, profession, a user's preferences, or a user's current location), or to control whether and/or how to receive content from the content notification service 130 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content notification service 130.

Figure 2:
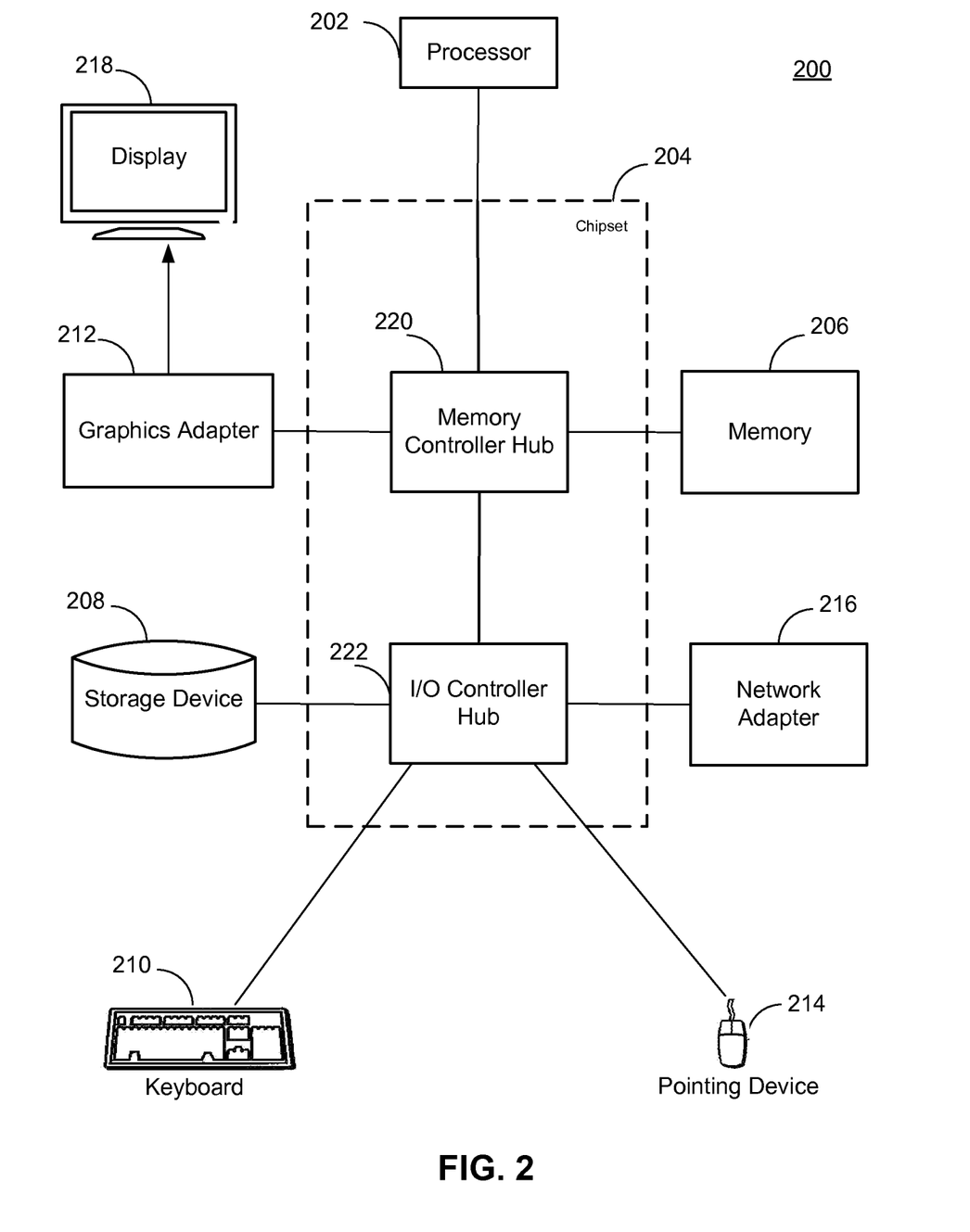
FIG. 2 is a high-level block diagram of a computer for acting as the content notification service, the relevancy source, the media source and/or a client device according to one embodiment.

The entities shown in FIG. 1 are implemented using one or more computers. FIG. 2 is a high-level block diagram of a computer 200 for acting as the content notification service 130, the relevancy source 140, the media source 150 and/or a client device 110 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. For example, the computers acting as the content notification service 130 can be formed of multiple blade servers linked together into one or more distributed systems and lack components such as keyboards and displays. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
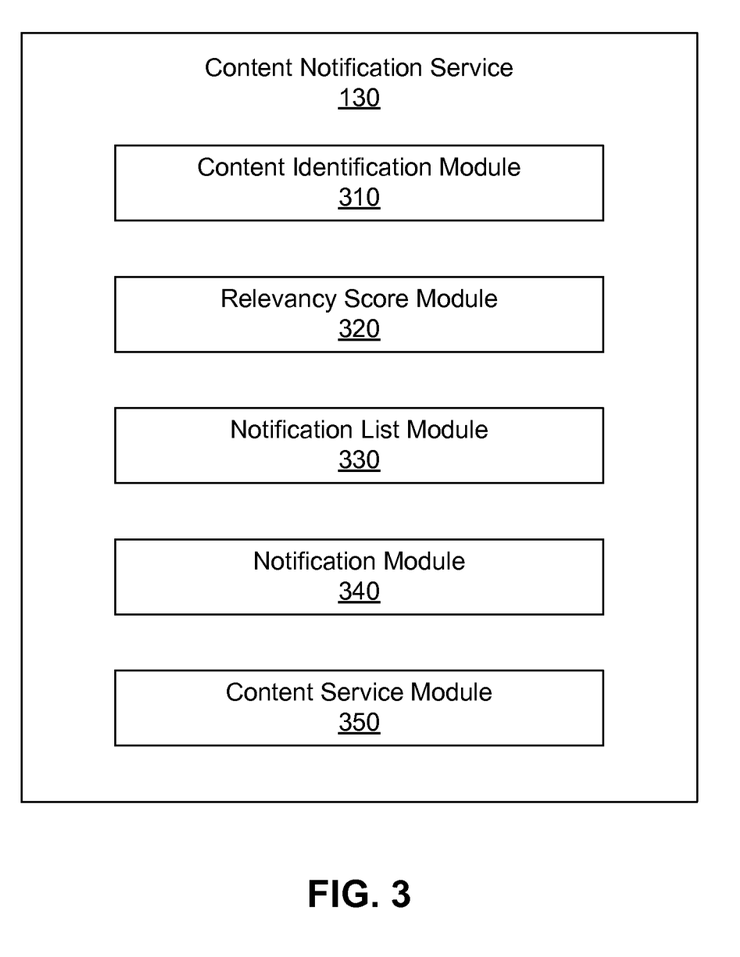
FIG. 3 is a block diagram illustrating modules within the content notification service according to one embodiment.

FIG. 3 is a block diagram illustrating modules within the content notification service 130 according to one embodiment. In the embodiment shown, the content notification service 130 includes a content identification module 310, a relevancy score module 320, a notification list module 330, a notification module 340 and a content service module 350. Other embodiments of the content notification service 130 can have different and/or additional modules other than the ones described here, and the functions may be distributed among the modules in a different manner.

The content identification module 310 analyzes the relevancy information from the relevancy source 140 to identify content relevant to the users of the client devices 110. As mentioned above, the relevancy information may describe the relevance of content based on a user's own actions or based on other user's actions. The content identification module 310 analyzes the actions described in the relevancy information to discover content items (e.g., particular videos) that are relevant to a particular user.

A user's actions described by the relevancy information may explicitly or implicitly identify content that is relevant to the user. The user may explicitly identify content as relevant to the user by flagging or otherwise marking the content for later review. For example, the user may use a user interface (UI) element provided by the media source 150 to explicitly mark content for later review. The content identification module 310 observes such explicit actions in the relevancy information and identifies the associated content as relevant to the user.

The user may implicitly identify content as relevant by engaging in behaviors implying the user has an interest in content associated with the behaviors. The user may subscribe to "channels" of content provided by the media source 150. The content identification module 310 may determine the channels to which the user subscribes, and identify new content or other content the user has not watched in the channel as relevant to the user. Similarly, the user may conduct searches for content that matches search criteria on the media source 150 or another entity connected to the network 120. The content identification module 310 may observe these searches and detect the arrival of new content that satisfies the search criteria. The content identification module 310 may identify the new content as relevant to the user.

In addition, the content identification module 310 may identify content relevant to a user based on other users' actions described in the relevancy information. In one embodiment, the content identification module 310 identifies content shared by the user's contacts in a social media network as relevant to the user. Likewise, the content identification module 310 may identify videos watched by users who are similar to the user as relevant to the user.

A relevancy score module 320 calculates relevancy scores for the content identified by the content identification module 310. In one embodiment, the relevancy score module 320 calculates a relevancy score for each specific content item (e.g., each video) identified as relevant to a particular user. The relevancy score measures how relevant or important the content item is to the particular user, i.e., the score represents the user's predicted interest in consuming the content. In one embodiment, the relevancy score is a numeric value between 0 and 1, where 0 indicates the associated content is not relevant and 1 indicates that the associated content is extremely relevant. Other embodiments of the relevancy score module 320 represent the relevancy score using other techniques.

The relevancy score module 320 calculates the relevancy scores using a combination of various signals. In one embodiment, the relevancy score module 320 calculates a relevancy score as a weighted combination of values representing the strengths of the individual signals, where the combination is normalized to a value between 0 and 1. Other embodiments may use other techniques to generate the relevancy scores.

The individual signals used by the relevancy score module 320 are derived from the relevancy information received from the relevancy source 140. In one embodiment, there are separate signals representing the users' explicit behaviors, the users' implicit behaviors, and other users' behaviors. For example, for a given content item identified by the content identification module 310 and a particular user, the relevancy score module 320 may assign values to signals indicating whether the user explicitly marked the content for later review, whether the content appears in a channel to which the user subscribes, and whether the content would appear in search results of one or more searches conducted by the user. In addition, the relevancy score module 320 may assign values to signals indicating the popularity of the content among other users within the user's social network, the popularity of the content among users similar to the user, and the popularity of the content among users at large.

The relevancy score module 320 assigns values to these signals based on the strength of the signal as an indicator that the content is relevant to the user. In one embodiment, the values are binary, with a '1' indicating the signal is present and a '0' indicating that the signal is not present. In another embodiment, the values are continuous and represent the relative strength of the signal as an indicator of relevance. The values may include a mix of binary and continuous values. For example, the value for the signal indicating whether a user explicitly marked a content item for later review may be a binary signal while the value for the signal indicating the popularity of the content in the user's social network may be a continuous value.

In addition, the relevancy score module 320 assigns weights to the signals. The weights control the influence of the individual signals on the relevancy score. In one embodiment, the weight for a signal reflects the importance of the signal. For example, the user explicitly marking a content item for later review is a strong signal that the content item is relevant to the user. Therefore, this signal has a large weight that grants the signal a large influence on the relevancy score. Other signals, in contrast, are weaker indicators that the content is relevant to the user and, therefore, have correspondingly lower weights. In one embodiment, the weights of the signals are adjusted for recency, with more recent activities having greater weight than less recent activities.

In one embodiment, the relevancy score module 320 uses machine learning techniques to generate the relevancy score. For example, the relevancy score module 320 may use one or more statistical classifiers that are trained using training data representing the known relevance of content to users to determine the relevance of different content to different users. Such classifiers and training data may incorporate the signals and weights described above. One or more trained classifiers are applied to the relevancy information to generate the relevancy score. In addition, other scores generated by the content notification service 130 may also be generated using these machine learning techniques.

The notification list module 330 generates lists of relevant content for users about which the users can potentially be notified. The notification list module 330 generates the list of relevant content based on the relevancy scores that the relevancy score module 320 associates with the relevant content identified by the content identification module 310. In one embodiment, the notification list module 330 uses a threshold to determine whether to add relevant content to the notification list for a user. For example, the notification list module 330 may compare the relevancy score associated with a content item and user to the threshold and add the content item to the user's list of relevant content if the score exceeds the threshold. The content item is not added to the list if it does not exceed the threshold.

The value of the threshold may vary in different embodiments. In one embodiment, the notification list module 330 uses a relatively high threshold value so that only relatively few content items are added a user's notification list. Limiting the notification list to relatively few content items has the downstream effect of limiting the number of notifications sent to the user, thereby reducing the potential to annoy the user by sending unwanted notifications.

The notification module 340 determines when and how to notify users of the content on their respective lists of relevant content. In one embodiment, the notification module 340 observes a user's activities and determines an appropriate time to notify the user (e.g., a time when the user is favorably disposed to consume the content, such as when the user is watching television). The notification module 340 also uses the user's activities to determine an appropriate type of notification for the user. The notification module 340 sends the user the appropriate type of notification at the appropriate time. If there is no content on a user's list of relevant content, or there is not an appropriate time, the notification module 340 need not send any notification to the user.

To determine the appropriate time to notify a user, the notification module 340 considers a variety of information about the user's current activities at given times. In an embodiment, the notification module 340 receives information from the client devices 110, media source 150, and/or other sources that describe the user's activities at the current time. For a given user, this information may include the locations of one or more client devices 110 used by the user, the state of the devices (e.g., turned on or off), how the devices are currently being used, and any notification settings established by the user with respect to the devices.

The notification module 340 uses a weighted combination of values for signals derived from the user's activities to produce a notification score for the user, similar to how the relevancy score module 320 uses values of signals to calculate relevancy scores. The value of the notification score indicates whether it is a good time to notify the user, with a higher score indicating that the time is more appropriate. In one embodiment, the notification module 340 repeatedly calculates the notification scores as information about the user's activities changes. For example, the notification module 340 may recalculate the user's notification scores for current times as new information about the user's activities is received, on a periodic basis such as every 15 minutes, and/or at other times. In another embodiment, the notification module 340 produces notification scores for future times (e.g., for future time intervals), and the scores thus predict future times when it will be appropriate to notify the user.

The individual signals used by the notification module 340 are derived from the user activity information and/or other information. In one embodiment, the signals for a user include the locations of the user's devices (e.g., whether the devices are located at home, at work, or in transit) and the times of day at the locations (e.g., is it currently during business hours at the locations). The signals also include the client devices 110 currently being used by the user (e.g., is the user currently using a smart phone, a television, a tablet computer, or other such device) and the user's current activities on the client devices 110 (e.g., is the user currently using the device to watch videos or consume other content). In addition, the signals may also include any notification settings set by the user for the client devices 110 (e.g., whether the user has configured the device to block unsolicited notifications). The notification module 340 assigns values to these signals based on the strength of the signal as an indicator that it is an appropriate time to notify the user of relevant content.

The notification module 340 may assign weights to the values of the signals to control the influence of the signals on the overall notification score. Generally, the weights reflect the significance of the signal on whether the notification time is appropriate. Thus signals that strongly indicate the time is appropriate receive more weight than signals that are weaker indicators. In addition, the signals and weights can be positive or negative. For example, a signal that indicates the user is driving may be a negative signal because the user is unlikely to want to view content while driving.

In one embodiment, the notification module 340 compares the notification score for a user to a threshold to determine whether to notify the user of the relevant content on the notification list. If the notification score exceeds the threshold, then the time represented by the signals contributing to the notification score is a time when the user is favorably disposed to consume content. Thus, the notification module 340 may determine to notify the user of the content if the notification score exceeds the threshold. This comparison may be performed each time the notification score for the user is updated.

Further, an embodiment of the notification module 340 uses the relevancy score in combination with the notification score to determine whether to send a notification. The notification module 340 may change the notification threshold based on the relevancy score. For example, the notification module 340 may decrease the threshold as the relevancy score increases, so that a notification is more likely to be sent for relevant content than for less relevant content.

In another example, the notification module 340 may combine the relevancy and notification scores to produce a normalized combined score that influences the determination of whether to send a notification based on the relevancy of the content. The notification module 430 weighs the components of the normalized combined score so that a notification is more likely to be sent for relevant content than for less relevant content. In one embodiment, the notification module 340 compares the normalized combined score with the threshold to determine whether to send the notification. In another embodiment, a table range lookup is used instead of a threshold, where the table specifies different ranges of potential values of the relevancy and notification scores and whether to send the notification for the given ranges of values.

The notification module 340 further determines to which client device 110 to send the notification. If a user uses multiple client devices 110, the notification module 340 uses the user activity information to select the client device 110 or devices to which to send the notification. In one embodiment, the notification module 340 selects the client device 110 at which the user is likely to consume the content. The notification module 340 uses the user activity information to determine which client device the user is using, or likely to use, to consume the content. The notification module 340 then selects this device (or devices) for receiving the notification.

For example, if the user typically consumes content on a smart phone, the notification module 340 may send the notification to the smart phone. If the user has both a smart phone and a media streaming device on which the user often consumes content, and the user activates (e.g., turns on) the media streaming device, the notification module 340 may send the notification to only the media streaming device. In contrast, if the user activity data show that the user tends to use the smart phone while also using the media streaming device to consume content, the notification module 340 may send the notification to both devices. Thus, if the user turns on a TV or other media streaming device, the notification module 340 may detect this event and send a notification to the user's smart phone or other device. After the user selects (e.g., clicks on) the notification message on the smart phone, the content may start streaming to the media streaming device and a UI for controlling the streaming content may be displayed on the smart phone.

In addition, the notification module 340 selects a type of notification to send to the selected client device 110. Each type of device may support one or more different types of notifications. For example, some devices may allow notifications to be made via a notification message listed in an area of the client device 110 devoted to listing relevant activity suggestions to a user of the client device, such as the suggestion area of the GOOGLE NOW feature provided to certain devices by GOOGLE INC. Likewise, the notification can be made in the form of a message displayed on the home screen, or another UI screen, of a media streaming device such as the CHROMECAST device available from GOOGLE INC. The notification can also be a push notification sent directly to the user's smart phone or other type of client device 110.

These various types of notifications may be arranged in a spectrum based on the respective amounts of intrusiveness of the notifications. Generally, a very intrusive notification is one that may interrupt the user. For example, a push notification is very intrusive because a client device 110 receiving such a notification typically generates an alert to the user by playing a sound, vibrating, or performing an equivalent function. This alert may interrupt the user's other activities. A notification made by listing content in the activity suggestions area of the client device 110, in contrast, is minimally intrusive because the user typically only sees this area of the client device when the user is actively seeking suggestions. Other types of notifications, such as a message displayed on the home screen fall between these two extremes on the spectrum of intrusiveness.

In one embodiment, the notification module 340 selects the notification type based on a combination of the relevancy score for the content and the notification score for the user. The notification module 340 may use a weighted combination of these scores. The weighted combination need not be the same as the combination used to produce the normalized combined score described above. Alternatively, the notification module 340 may select the notification type based on just one of the content and notification scores, and/or based on other factors.

Generally, the notification module 340 selects a more intrusive notification if the relevancy score and notification score are higher. Thus, if the content is very relevant and the time is very appropriate for consuming content, the notification module 340 may select a push notification for the user.

In one embodiment, the notification module 340 combines the relevancy and notification scores to produce a normalized type score. The notification module 340 determines the types of notifications available for the selected client device 110 and arranges these types from least intrusive to most intrusive. The notification module 340 associates each of the notification types with a band of type score values, so that the less intrusive notification types are associated with bands of lower type score values and more intrusive notification types are associated with bands of higher type scores. For instance, if the type score is normalized between 0 and 1, the notification module 340 may associate the least intrusive notification type (e.g., a listing in a suggestion area) with the band of values from 0 to 0.25, associate the most intrusive notification type (e.g., a push notification) with the band of values from 0.76 to 1, and associate intermediately intrusive notification types with bands of values between 0.26 and 0.76. The notification module 340 selects the notification type associated with the value of the type score.

The notification module 340 notifies the user of the relevant content by sending the selected type of notification to the selected user device. In one embodiment, the notification includes a brief message describing the content to the user. The notification may include excerpts of metadata describing the content (e.g., a title or other information about the content), one or more snippets of the content (e.g., frames from a video), and an explanation of why the content is deemed relevant to the user. In addition, the notification may include a link or other UI element with which the user can interact to obtain and consume the content.

The content service module 350 provides content to users. In one embodiment, the content service module 350 receives the user interactions with the notification and provides the content from the media source 350 in response thereto. The content service module 350 may provide the content to the same client device 110 to which the notification was delivered or to a different device. Further, the content service module 350 may automatically select the device to which to send the content based on the user activity information. For example, the notification may be sent to a user's smart phone and the content may be sent to the user's media streaming device.

Figure 4:
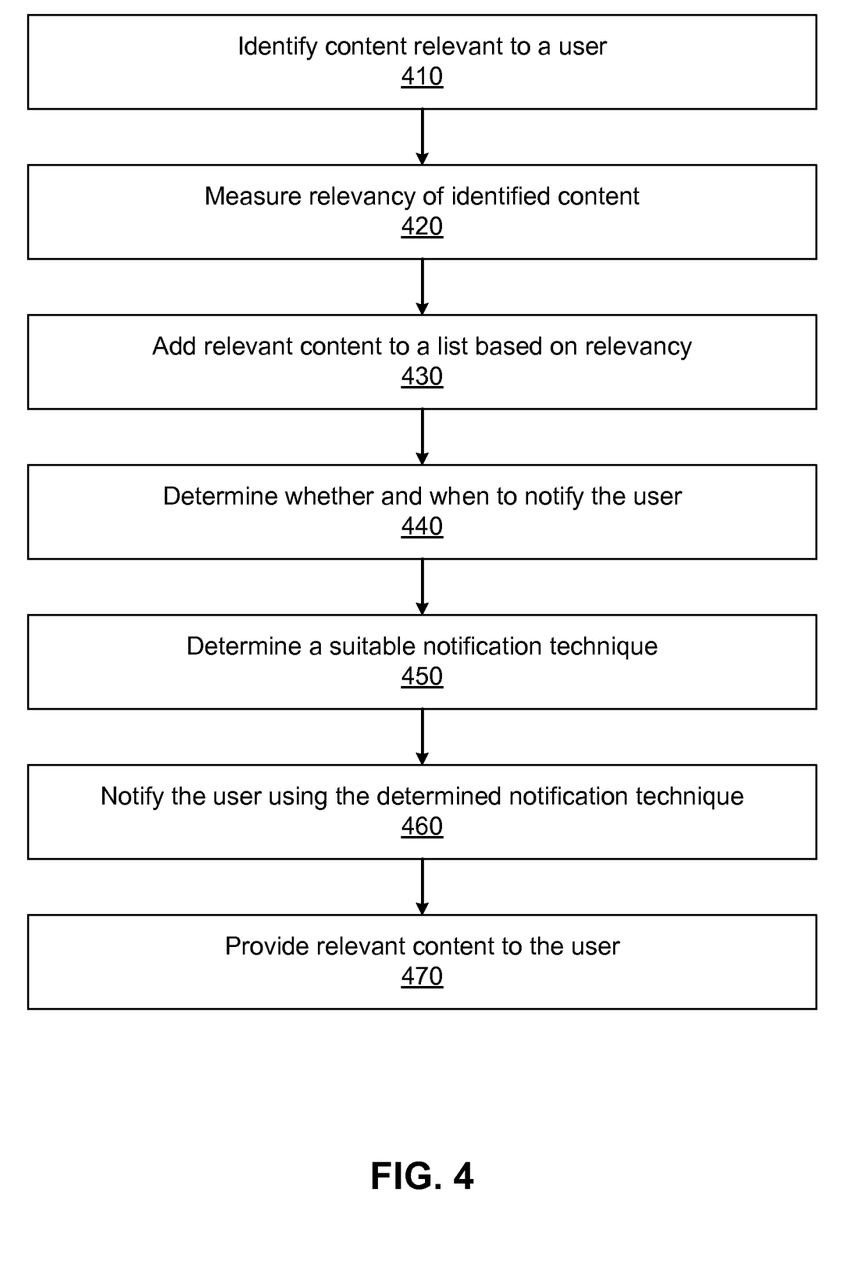
FIG. 4 is a flowchart illustrating a process for notifying users of relevant content according to one embodiment.

FIG. 4 is a flowchart illustrating a process for notifying users of relevant content according to one embodiment. FIG. 4 attributes the steps of the process to the content notification service 130. However, some or all of the steps may be performed by other entities. In addition, some embodiments may perform the steps in parallel, perform the steps in different orders, or perform different steps.

Initially, the content notification service 130 identifies 410 digital content (e.g., a video) relevant to a user of a client device 110. The content notification service 130 analyzes relevancy information and identifies content as relevant based on the user's own explicit or implicit actions and/or based on the actions of other users. The content notification service 130 measures 420 the relevancy of identified content items to a user. To this end, the content notification service 130 calculates a relevancy score for each content item.

The content notification service 130 adds 430 one or more of the identified content items to a list of relevant content items for the user based on the measured relevancy of the content items. At step 440, the content notification service 130 determines whether to notify the user and when to notify the user about the relevant content items. The content notification service 130 observes the user's activities and produces a notification score indicating whether and when it is appropriate to notify the user of the content. In addition, the content notification service 130 determines 450 a suitable notification technique for the notification. The content notification service 130 determines to which client device 110 to send the notification, and selects a type of notification to send. The type of notification may be selected based on a combination of the relevancy and notification scores, such that a more intrusive type of notification is selected if the relevancy and/or notification scores are higher.

The content notification service 130 notifies 460 the user of the relevant content at a suitable time using the determined notification technique. In addition, the content notification service 130 provides 470 the content to the user in response to the user interacting with the notification.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

While particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein. The scope of the invention is to be limited only by the following claims.

The invention claimed is:

1. A computer-implemented method of notifying a user of relevant content, comprising:
   receiving relevancy information describing a relevance of a digital content item to the user;
   calculating a relevancy score that indicates a predicted interest of the user in consuming the digital content item based on the relevancy information;
   determining, responsive to the relevancy score, whether to notify the user of the digital content item;
   responsive to determining to notify the user, inferring from activities of the user a time when the user is favorably disposed to consume the digital content item, wherein the inferring includes calculating a notification score that describes one or more activities of the user at a current time;
   identifying a plurality of notification types supported by a client device;
   selecting a notification type of the plurality of notification types responsive to the relevancy information, wherein selecting the notification type includes combining the relevancy score and the notification score to produce a type score normalized between a lowest value and a highest value and selecting the notification type based on the type score; and
   sending a message having the selected notification type to the client device used by the user at the time when the user is favorably disposed to consume the digital content item to notify the user of the digital content item.

2. The method of claim 1, wherein receiving relevancy information comprises:
   observing searches conducted by the user for content that matches search criteria;
   detecting an arrival of new content that satisfies the search criteria; and
   identifying the new content as the digital content item.

3. The method of claim 1, wherein the relevancy score is calculated from a plurality of weighted signals derived from the relevancy information and wherein determining whether to notify the user of the digital content item comprises comparing the relevancy score to a threshold and determining to notify the user of the digital content item responsive to the comparison of the relevancy score to the threshold.

4. The method of claim 3, wherein calculating the relevancy score comprises:
   training a statistical classifier using training data representing known relevance of content to users; and
   applying the trained statistical classifier to the relevancy information to produce the relevancy score.

5. The method of claim 1, wherein inferring from activities of the user a time when the user is favorably disposed to consume the digital content item comprises:

receiving user activity information from the client device that describes one or more activities of the user at a current time;

deriving a plurality of signals from the user activity information, wherein the notification score is calculated from a weighted combination of the plurality of signals, the notification score indicating whether the current time is a good time to notify the user;

comparing the notification score to a threshold; and inferring that the user is favorably disposed to consume the digital content item at the current time responsive to the comparison of the notification score to the threshold.

6. The method of claim 5, further comprising recalculating the notification score on a periodic basis.

7. The method of claim 1, wherein sending a message to a client device used by the user comprises:

identifying a plurality of client devices used by the user;

selecting a client device of the plurality of client devices on which the user is likely to consume the digital content item; and sending the message to the selected client device.

8. The method of claim 1, wherein sending a message to a client device used by the user comprises:

identifying a plurality of client devices used by the user;

detecting activation of a first client device of the plurality of client devices on which the user consumes content; and sending a message to a second client device of the plurality of client devices responsive to detecting activation of the first client device.

9. The method of claim 1, wherein selecting a notification type comprises:

associating each of the plurality of notification types to a different band of values between the lowest value and the highest value, wherein the notification type is selected based on a band of values in which the type score is located.

10. A computer system for notifying a user of relevant content, comprising:

a computer processor for executing computer program instructions;

a non-transitory computer-readable storage medium storing computer program instructions executable by the processor to perform steps comprising:

receiving relevancy information describing a relevance of a digital content item to the user;

calculating a relevancy score that indicates a predicted interest of the user in consuming the digital content item based on the relevancy information;

determining, responsive to the relevancy score, whether to notify the user of the digital content item;

responsive to determining to notify the user, inferring from activities of the user a time when the user is favorably disposed to consume the digital content item, wherein the inferring includes calculating a notification score that describes one or more activities of the user at a current time; and identifying a plurality of notification types supported by a client device;

selecting a notification type of the plurality of notification types responsive to the relevancy information, wherein selecting the notification type includes combining the relevancy score and the notification score to produce a type score normalized between a lowest value and a highest value and selecting the notification type based on the type score; and sending a message having the selected notification type to the client device used by the user at the time when the user is favorably disposed to consume the digital content item to notify the user of the digital content item.

11. The computer system of claim 10, wherein receiving relevancy information comprises:

observing searches conducted by the user for content that matches search criteria;

detecting an arrival of new content that satisfies the search criteria; and identifying the new content as the digital content item.

12. The computer system of claim 10, wherein the relevancy score is calculated from a plurality of weighted signals derived from the relevancy information and wherein determining whether to notify the user of the digital content item comprises comparing the relevancy score to a threshold and determining to notify the user of the digital content item responsive to the comparison of the relevancy score to the threshold.

13. The computer system of claim 12, wherein calculating the relevancy score comprises:

training a statistical classifier using training data representing known relevance of content to users; and applying the trained statistical classifier to the relevancy information to produce the relevancy score.

14. The computer system of claim 10, wherein inferring from activities of the user a time when the user is favorably disposed to consume the digital content item comprises:

receiving user activity information from the client device that describes one or more activities of the user at a current time;

deriving a plurality of signals from the user activity information, wherein the notification score is calculated from a weighted combination of the plurality of signals, the notification score indicating whether the current time is a good time to notify the user;

comparing the notification score to a threshold; and inferring that the user is favorably disposed to consume the digital content item at the current time responsive to the comparison of the notification score to the threshold.

15. The computer system of claim 10, wherein sending a message to a client device used by the user comprises:

identifying a plurality of client devices used by the user;

selecting a client device of the plurality of client devices on which the user is likely to consume the digital content item; and sending the message to the selected client device.

16. The computer system of claim 10, wherein sending a message to a client device used by the user comprises:

identifying a plurality of client devices used by the user;

detecting activation of a first client device of the plurality of client devices on which the user consumes content; and sending a message to a second client device of the plurality of client devices responsive to detecting activation of the first client device.

17. The computer system of claim 10, wherein selecting a notification type comprises:

associating each of the plurality of notification types to a different band of values between the lowest value and the highest value, wherein the notification type is selected based on a band of values in which the type score is located.

18. A non-transitory computer-readable medium storing computer program instructions executable to perform steps comprising:
- receiving relevancy information describing a relevance of a digital content item to the user;
- calculating a relevancy score that indicates a predicted interest of the user in consuming the digital content item based on the relevancy information;
- determining, responsive to the relevancy score, whether to notify the user of the digital content item;
- responsive to determining to notify the user, inferring from activities of the user a time when the user is favorably disposed to consume the digital content item, wherein the inferring includes calculating a notification score that describes one or more activities of the user at a current time;
- identifying a plurality of notification types supported by a client device;
- selecting a notification type of the plurality of notification types responsive to the relevancy information, wherein selecting the notification type includes combining the relevancy score and the notification score to produce a type score normalized between a lowest value and a highest value and selecting the notification type based on the type score; and
- sending a message having the selected notification type to the client device used by the user at the time when the user is favorably disposed to consume the digital content item to notify the user of the digital content item.

* * * * *